Sept. 1, 1936.　　　L. W. BOWERS　　　2,052,748
CONVEYER SYSTEM
Filed March 12, 1936　　　4 Sheets-Sheet 1

INVENTOR.
Lyle W. Bowers.
BY
　　　ATTORNEY.

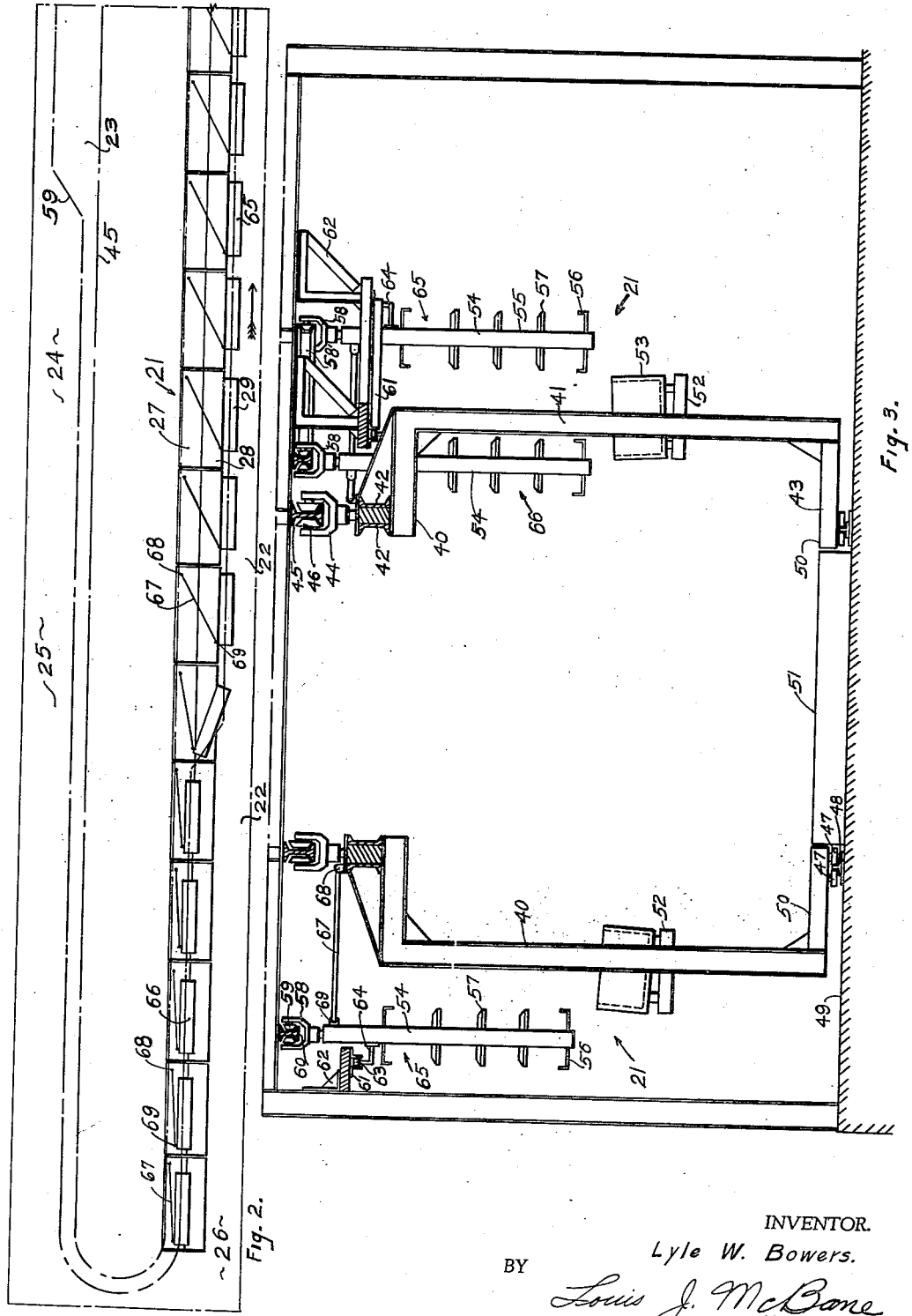

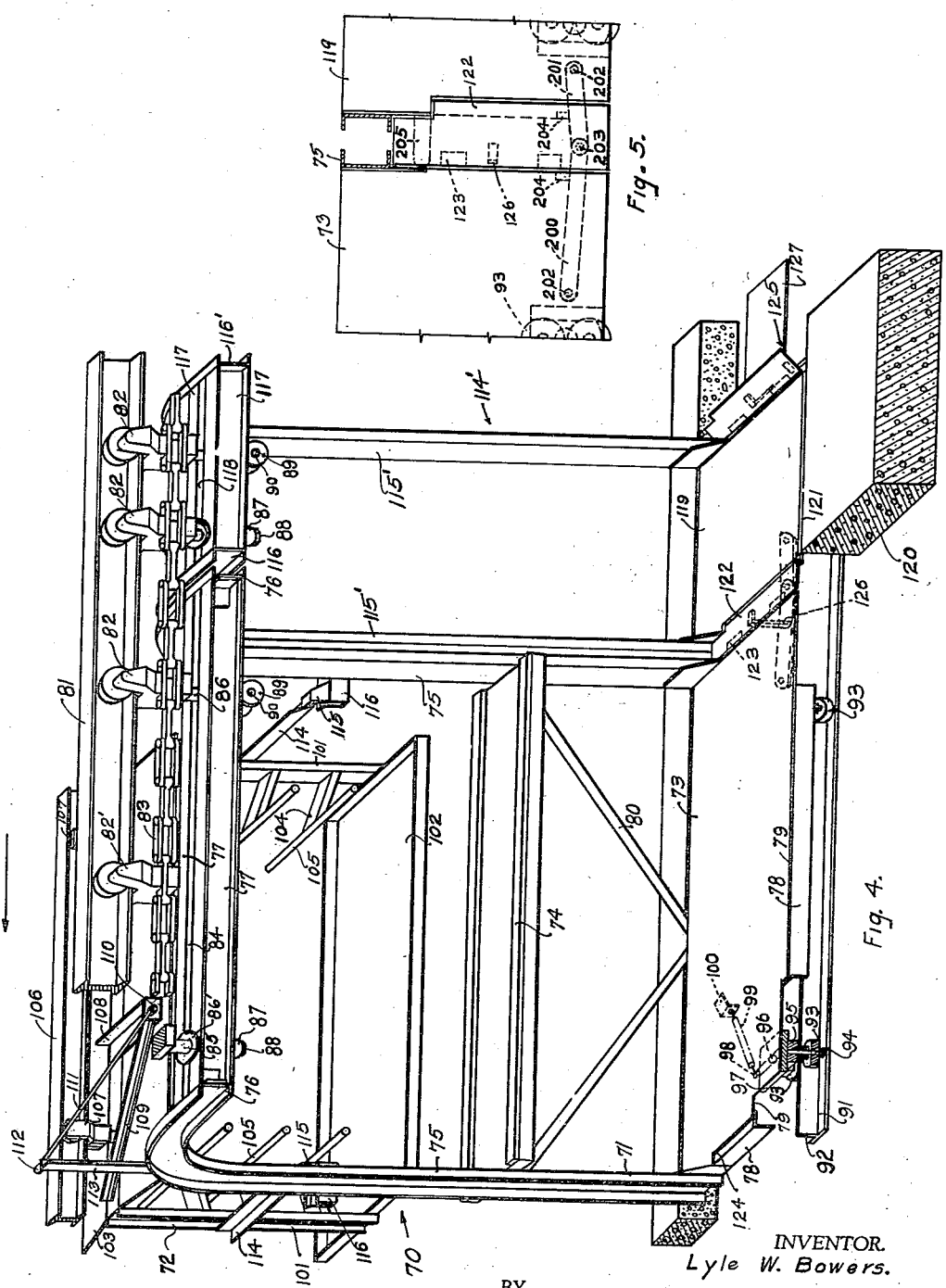

Sept. 1, 1936.                L. W. BOWERS                2,052,748
                              CONVEYER SYSTEM
                           Filed March 12, 1936          4 Sheets-Sheet 4
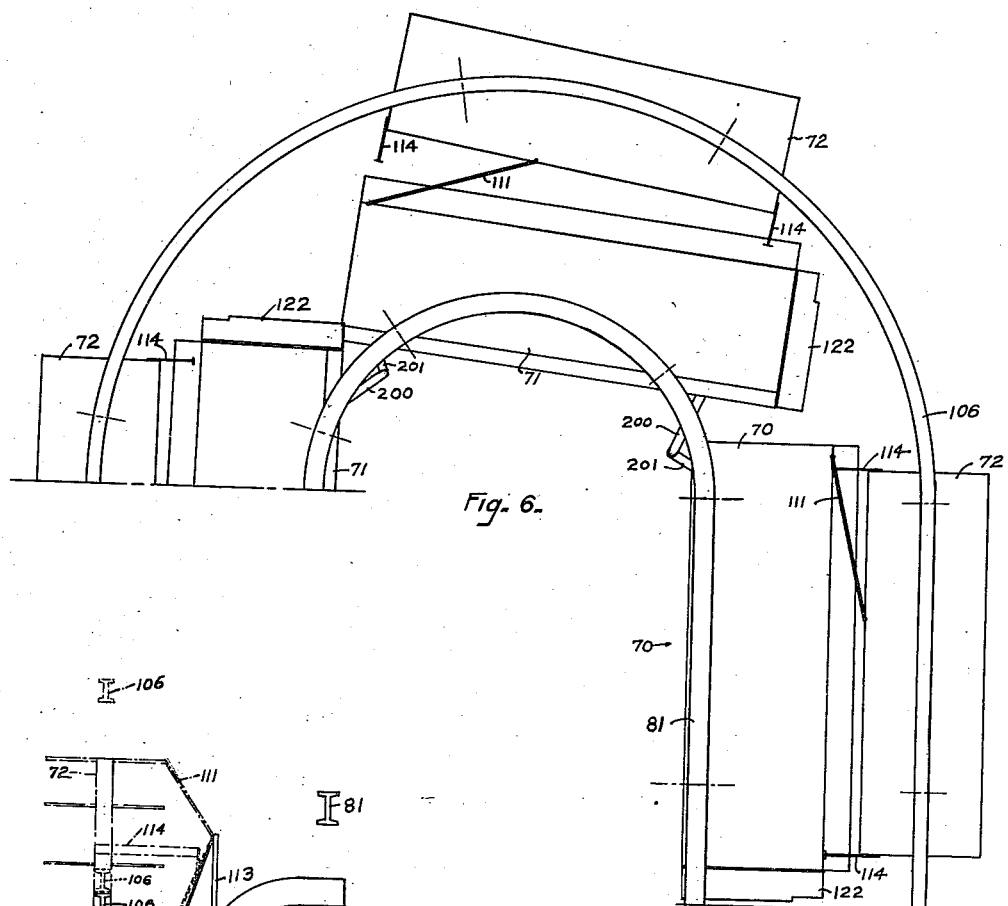
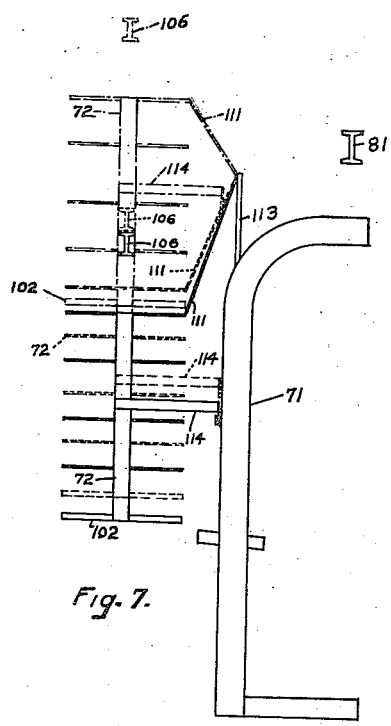
INVENTOR.
Lyle W. Bowers.
BY
ATTORNEY.

Patented Sept. 1, 1936

2,052,748

UNITED STATES PATENT OFFICE 2,052,748

CONVEYER SYSTEM

Lyle W. Bowers, Cleveland, Ohio

Application March 12, 1936, Serial No. 68,469

20 Claims. (Cl. 198—177)

This invention relates to equipment for facilitating manual operations in production of manufactured articles.

The invention is applicable to a broad variety of production operations in various industries and the description herein relating to a specific operation in a specific industry is an example of an application of this invention, the underlying principles being pointed out in connection therewith so that an appreciation of the broad application of the invention may be had. The invention will be described as applied to the placing of dishes in saggers preparatory to burning the ware in kilns, in the pottery industry.

A long established and familiar practice in placing dishes in saggers is as follows:

The glazed ware, in unburned condition, is arranged in a supply stock. Saggers are provided in a conveniently accessible supply. Trucks on which the filled saggers are leaded for movement into the kilns are brought to a position where they may be loaded. This work is done by men known as "placers".

The ware is to be placed in the saggers. Each piece of ware should not be in contact with any other piece and should not be in contact with the sagger. The ware is placed with pins between and separating the pieces. A supply of pins is always at hand.

The placer is provided with a work bench and a cabinet at the bench for holding the ware. The work of the placer consists in: carrying ware from the supply stock to his cabinet; carrying the sagger from the supply to his work table; placing the ware in the sagger (the supply of pins at the work table being attended to by an assistant); and carrying the filled sagger to the kiln car.

The placer is a skilled workman. The operation of placing is a meticulous one, much practice is required to become efficient at it. The placer spends much of his time carrying ware to his cabinet, saggers to his table, and filled saggers to the kiln car. The efficient application of the placer's time, to placing alone, is one objective in the solution of the problem to which this invention is directed.

One of the objectives of this invention is to replace the operations of carrying ware and saggers by power driven equipment.

Transportation of ware, empty saggers, and filled saggers is a conveyer problem. Certain limitations inherent in the problem render impracticable a conveyer for carrying ware and saggers to the placer. The ware varies in size and shape, there are many different kinds of pieces. Pieces placed in a single sagger are alike. There are saggers of various sizes and shapes, each for receiving a particular size and shape of ware. These circumstances require the exercise of intelligence in coordinating the supply of ware and saggers. If only one placer were to be supplied with ware and saggers, it might be possible to move both ware and saggers, properly paired, from a source of supply to the placer. But, the placers work in crews to handle the volume of production. Obviously, it is impractical to supply a whole crew of placers by one conveyer because the cadence of work varies from placer to placer and because the ware and saggers both vary in size and shape.

To insure proper pairing of ware and saggers being supplied to a placer, it is desirable that the workmen choosing the ware and saggers be together. They should cooperate at the time the placer's cabinet and work table is replenished with ware and saggers. Also, for efficiency, the placer's work table and cabinet should be replenished in a regular time cycle in order to set a predetermined cadence of operation which the average placer can be expected to keep up. Both of these requirements are met by bringing the placer's work table and cabinet and the ware and sagger supply together in regular sequence according to a predetermined time schedule. Rather than move the supply of saggers and ware, the work tables and cabinets are moved to the supply of ware and saggers. The placers travel with their work tables and cabinets, placing ware in saggers as they go. It is an object of this invention to provide a novel equipment for satisfying the above outlined requirements efficiently and reliably.

The filled saggers must be unloaded from the conveyer system. It is an object of this invention to provide equipment which, in addition to satisfying the above outlined requirements, transports the loaded saggers to a kiln car loading station. Also, the saggers containing the burned ware returning from the kilns must be emptied and returned to the sagger supply depot. It is an object of this invention to provide equipment, which, in addition to the foregoing objectives, provides for the removal of burned ware from saggers and transportation of the empty saggers to the supply depot.

Many other objectives and advantages of the present invention will appear in the following detailed description taken in connection with the accompanying drawings in which Figure 1 is a diagrammatic view, in plan, of conveyer equipment, of this invention, together with associated manufacturing facilities.

Figure 2 is a diagrammatic view, in plan, of another form of conveyer system.

Figure 3 is a view, in end elevation, partly in section, of some units of the conveyer system of Figure 2.

Figure 4 is a view, in perspective, of typical parts of another form of the invention.

Figure 5 is a view, in plan, of a detail of Figure 4.

Figure 6 is a diagrammatic view, in plan, illustrating certain characteristic positions of units illustrated in Figure 4.

Figure 7 is a diagrammatic view, in elevation, illustrating certain relative positions of the parts of the unit of Figure 4.

Figure 1:
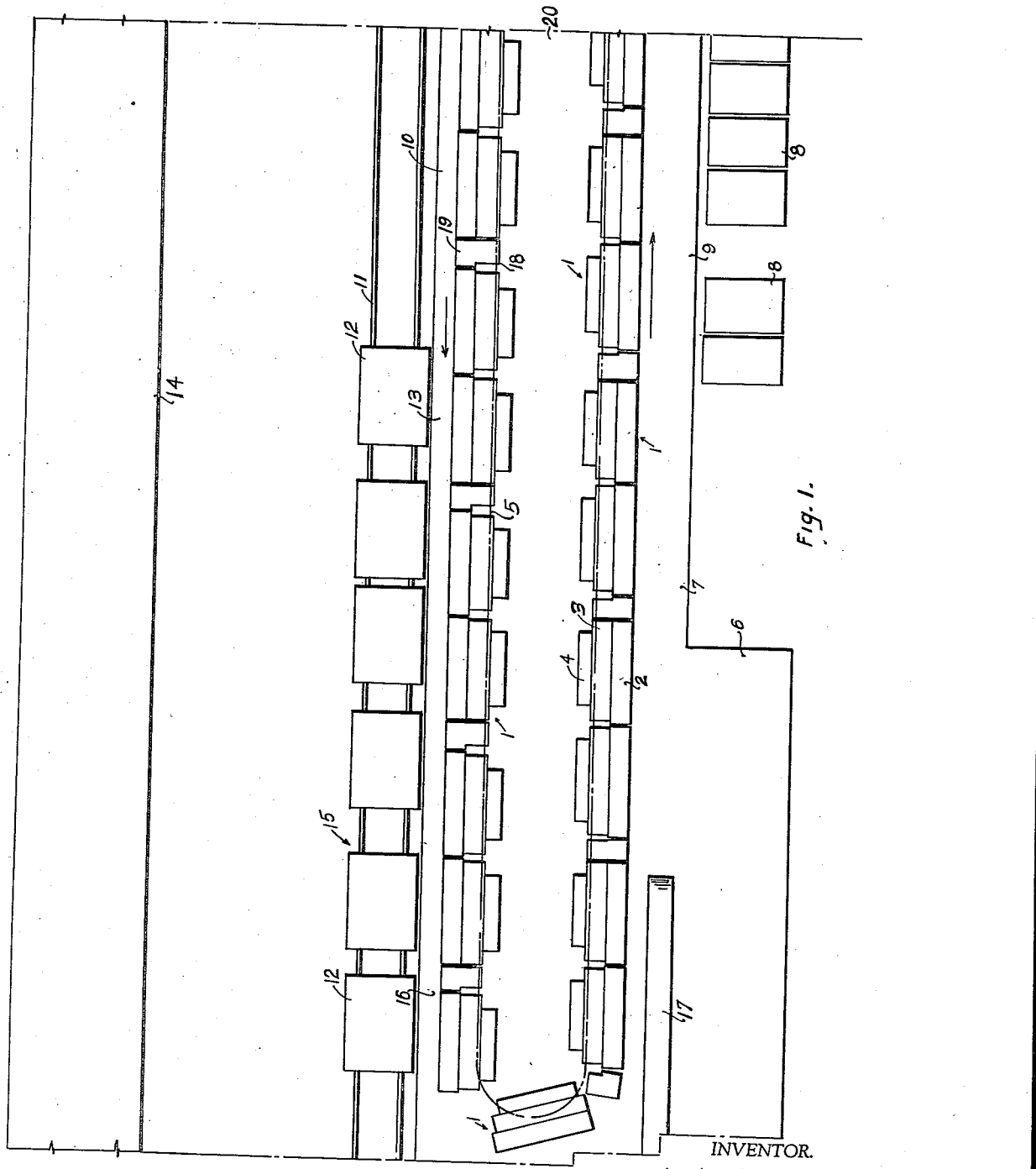

According to this invention, the activities of the placer, other than placing of ware in saggers, are tranferred from him to other operators and to the equipment of this invention. This is done to conserve the time of the placer and to make the best use of his skill. Operations, other than placing, involve the supplying of both ware and saggers from supply depots to a whole group of placers, at the placers' work benches and cabinets. According to this invention, a power driven conveyer system is used to bring together the placer, the ware, and the sagger.

Since placers work in crews, the conveyer means is arranged so that all placers will be supplied from one source. Since wares of a particular variety can be placed only in saggers of a corresponding size and shape, intelligent selection of the sagger and the ware, which is provided to a placer, must be made. Therefore, the supply of the ware and supply of the saggers must be under the control of the workmen who are so located as to be aware of the activities of each other. According to this invention, the placer's work tables and work supply cabinets are moved to the depots of supply of ware and saggers.

The ware depot and the sagger depot are adjacent. The work bench and cabinet together are moved to one depot, then to the other. Either saggers or ware is loaded first. Then, the other, of either saggers or ware is loaded. The workmen observe the operations of one another, or both depots may be served by one workman.

The work benches and cabinets together are moved to the supply depots and from the supply depots in regular sequence. The cycle for passing all the work benches and cabinets to and from the supply depot is according to a predetermined time schedule. The placers travel with the work benches and cabinets and the time schedule sets a standard for the cadence of work by the placers. This affords efficiency and good production control. The time schedule is such as to utilize the time of the placers fully, in placing, with allowance for individual variations, mistakes and accidents.

A diagrammatic illustration of equipment for practising this invention is shown in Figure 1.

The placer rides with the work table, work bench and cabinet. The floor or platform upon which the operator rides, the work table and the cabinet altogether form a unit in the conveyer system. Such units are indicated at 1 in Figure 1. Units 1 comprise a platform 2 for the placer, a work bench 3, and a cabinet 4. The particular relation of the parts of the units shown in Figure 1 is not intended to be structurally accurate, only illustrative. Units 1 are supported by and movable along a suitable track indicated by line 5. The units 1 are arranged side by side, as indicated in Figure 1, and are connected together by a conventional chain. Power supplied to the chain through suitable means of conventional construction moves the cars along the conveyer. The conveyer system is in the form of a loop, only one end of which is illustrated in Figure 1. As the conveyer is operated, the units 1 pass around the loop in continuous sequence and according to a predetermined time schedule. The direction of travel is as indicated by arrows in Figure 1.

A sagger depot is indicated at 6 and the sagger loading platform at 7. The ware, having the glaze finish thereon, is brought to the conveyer system on trucks 8, which form the ware depot. Trucks 8 are arranged near to the ware loading platform 9.

As the units 1 approach the sagger loading platform 7, they are empty except for a supply of pins always kept in all of the cabinets. The pins are uniform and they may be replenished at any time at all cabinets. Saggers chosen according to production schedule are placed on the work benches 3 at platform 7 as the units 1 move along that platform. The units 1 progress from platform 7 to platform 9 where ware, chosen to fit the saggers already on the work benches, is loaded into the cabinets 4.

In the form of invention illustrated in Figure 1, the units 1 are arranged with the placer's platform on the outside of the loop. The placer faces toward the inside of the loop. The work bench is before him and the ware cabinet 4 above and in back of the work bench. The work bench is easily accessible to platform 7 for loading. The ware cabinet 4 may be loaded from the platform 9. As will be described later, the structure of the units 1 may be such that the ware cabinet 4 will be moved automatically outwardly of the loop to a position more accessible to platform 7 when the units are passing that platform. If desired, the placer himself may perform the sagger loading and ware loading operations as the units 1 pass the platforms 7 and 9.

There may be a unit 1 for each placer. Other factors which limit the rate of operation of the conveyer system make it desirable that each placer serve several of the units 1, four for example.

The length of the loop and the rate of operation is such that the placer has adequate time to fill all of the saggers assigned to him. The filled saggers must be discharged from the conveyer, loaded upon kiln cars, passed through the kiln, cooled, the burned ware discharged from the sagger, and the empty sagger cleaned and returned to the sagger depot. If desired, the loaded saggers may be discharged from the conveyer system, illustrated in Figure 1, just before the units 1 reach the sagger depot and the above mentioned auxiliary operations attended to entirely independently of the conveyer system. For reasons of efficiency and economy, it is desirable, according to this invention, to adapt the conveyer system of this invention for the performance of the last mentioned functions as well as to increase the efficiency of the placer crew.

The placers' work may be completed on that end of the conveyer loop extending from the platform 9 and to a location 10 approximately opposite the platform 9. When the units 1 reach location 10, the saggers are filled and ready to be discharged. The conveyer system is arranged alongside of and parallel to the track 11 for the kiln cars 12. Workmen on platform 13 may take filled saggers from the work benches 3 of nearby units 1. The filled saggers are loaded directly onto the kiln cars 12. The kiln cars 12 are moved along the track 11 and passed through the continuous kiln 14. When the cars 12 leave the kiln 14, time is allowed for the saggers and ware to cool and the kiln cars are then moved along the track 11 to a location indicated generally at 15. The cooled saggers are taken from the cars 12 on the platform 16. The burned ware may be removed and the empty saggers loaded on units 1 to be conveyed around to the sagger depot 6 where the saggers are taken from units 1, cleaned and stored, ready for further use. If desired, the saggers with the burned ware therein may be loaded onto units 1 and the ware removed by workmen as the units move along, the workmen riding on the units. Wares so removed may be loaded upon a conveyer 17 for transportation to another department.

The operations auxiliary to placing the ware in saggers may be attended to by the placers or by less skilled workmen. The operations of placing begin at platform 9 and end at the location 10. The conveyer system is provided with additional units 18, arranged at intervals between the units 1 and carried as part of the conveyer system. The units 18 are access cars consisting only of the necessary framework and a floor or platform 19 to permit a placer to step from outside the conveyer system to the platform 20 within the conveyer system, and vice versa, at any time while the conveyer is in operation. When a placer has completed his work at location 10, he may step through access car to platform 20, then through another access car to platform 9 and onto the platform or floor of a unit 1 and there resume placing of ware. This reduces waste of time of the placers to a minimum.

Another form of the invention is illustrated in Figures 2 and 3. The units 21 of the conveyer system are arranged to move in a loop or circuit according to a predetermined time schedule as in the case of the system illustrated in Figure 1. In the course of movement of the units 21, each unit passes a sagger depot 22 and a ware depot 23 where the units are loaded with saggers and ware to be placed. The units continue their travel around the circuit in the direction indicated by the arrow in Figure 2 and placers fill the saggers as they travel with the units 21. The time schedule is such that the work of the placers is completed when location 23 is reached. The filled saggers are unloaded at location 24 and transferred to kiln cars (not shown). The saggers filled with burned ware are unloaded from kiln cars at location 25, the dishes removed and the empty saggers loaded on the units 21. The empty saggers are removed at location 26, cleaned and placed in the sagger depot for further use. Unloading of burned ware from the saggers may be done upon the units 21 as they travel along the conveyer system. Any suitable auxiliary conveyer (not shown) may be provided adjacent to the conveyer system, illustrated in Figure 2, for receiving the burned ware taken from the saggers.

The placers, having completed their work at location 23, immediately go to other adjacent units 21 which have completed the end of the circuit, illustrated in Figure 2, and have been provided with ware and saggers to be filled.

The equipment of Figures 2 and 3 affords ease of movement from unit to unit for the placers. The equipment also affords accessibility to the placer's cabinet for the ware loading workman. Also, the equipment provides easy access to the work table from without the conveyer system.

The units 21 consist of placer's platform 27, the work bench 28, and the ware cabinet 29, as illustrated diagrammatically in Figure 2.

As shown in Figure 3, the units 21 comprise a car 40, built of end channels 41, secured together across the top by channels 42 and across the bottom by framework 43, which may consist of angle irons and sheet metal in a box-like structure. This car is supported by yokes 44, connected with channels 42 and suspended for movement along beam 45 by rollers 46, rotatably mounted in yokes 44 and arranged to roll along a beam 45. The car 40 is supported against side sway by rollers 47 mounted on the under side of the structure 43 and engaging track 48 mounted on the floor 49. The beam 45 is supported on a suitable superstructure.

The structure 43 at the base of car 40 provides the platform or moving floor 50 for the placers. It will be observed that the platforms 50 are arranged within the conveyer circuit at opposite sides of a central area 51. When the placer completes his work and reaches location 23, he may step across area 51 to the opposite unit 21 and begin work at once. The units 21 are arranged side by side, as illustrated in Figure 2, so that a placer may move freely from unit to unit and back and forth across the platform 51. This freedom of movement enables the placers of a crew to assist one another whenever an individual lags behind schedule for any reason. Experience shows that this factor is an important one in maintaining the work schedule as determined by the rate of operation of the conveyer system.

The work benches 52 are supported by and between the vertical channels 41 which constitute the end pieces of car 40. It is arranged at a position relative to the platform 50, most convenient for the placer. Saggers 53 are placed on the work table 52 and remain there during placing until the filled sagger is taken from the unit.

The ware cabinets are shown at 54. The cabinets 54 consist of vertically arranged channels 55 which constitute the end pieces of the cabinet. Horizontally arranged channels connect the vertical pieces 55 at top and bottom to make a rigid framework. Trays 56 are mounted near the bottom of the framework and serve to carry pans filled with pins to be used in placing the ware. Shelves 57 are mounted on the end pieces 55 and serve to receive the ware which is arranged on boards and brought to the cabinets in that way. The boards with the ware thereon are placed on the shelves 57 for use by the placer. The ware cabinets 54 are supported by yokes 58, connected with the top channels of the cabinet frame. The yokes 58 are suspended from a beam 59 by rollers 60, mounted for rotation in the yokes 58 and arranged to travel along the beam 59. The beam 59 is supported on a suitable superstructure. A track 61 is mounted upon a suitable superstructure 62. Roller 63 is carried upon bracket 64, mounted on the frame of the cabinet 54. The roller 63 rides within track 61 and supports the cabinet from side sway.

The position of the ware cabinet during placing is illustrated at 65. In that position it is arranged conveniently for the placer. The position 65 of the cabinet blocks access to the work table 52 from outside of the conveyer system. The operations of unloading the filled sagger from the work table, of placing on the table a sagger from the kiln, either with or without the burned ware in it, of unloading the used sagger at location 26 and of loading cleaned saggers at location 22, all are effected from locations outside of the conveyer system. To make the work table 52 accessible, for the last mentioned operations, the beam 59, indicated diagrammatically in Figure 2, is arranged adjacent to the beam 45 at one end of the conveyer circuit as shown in Figure 2. When the car 40 moves from location 23 to location 24, the cabinet 65, following the beam 59, moves into the position 66, illustrated in Figures 2 and 3. With the cabinet in position 66, the work table 52 is readily accessible and the car 40 becomes simply a conveyer for saggers placed on the table 52, as the cars travel from location 24 around to location 22. As the units reach the ware loading position, the beam 59 is arranged more distantly from the beam 45 and the cabinet 54 moves from position 66 back into position 65, as illustrated in Figures 2 and 3. In this position, cabinet 54 is readily accessible to workmen outside of the conveyer for loading it with ware. Placing of the ware proceeds with the cabinets in position 65 and the cycle is repeated.

The cars 40 are driven along beam 45 by a suitable chain driven from a conventional source of power (not shown). This is common conveyer practice. To permit the change in position of cabinet 54, relative to car 40, described above, while maintaining the cabinets and cars in properly paired association to form units, each cabinet is associated with a car 40 and is moved by a connection with its respective car. For that purpose, a connecting rod 67 is provided. The connecting rod 67 is attached to the car 40 at a ball and socket joint 68 and to the respective cabinet by ball and socket joint 69. As the position of beam 59 relative to the beam 45 changes, the cabinet 54, following the beam 59, is pulled along by the respective car 40. The connecting rod 67 swings about the ball and socket joints to accommodate the changed positions between the cabinet and car while transmitting the force necessary to move the cabinet. As shown in Figure 2, the connecting rod 67 swings about the ball and socket joint 68 as the cabinet 54 moves between positions 65 and 66. This involves some horizontal displacement between the cabinet and car in the direction of movement of the conveyer as well as lateral thereto. As will be observed from Figure 2, the arrangement of cabinets, cars, and connecting rods is such that such lengthwise displacement is readily accommodated.

The mode of operation of the conveyer system as a whole has been outlined. The construction of the conveyer system entails certain novel features essential to the successful operation of the conveyer system. Figure 4 illustrates the construction of a typical placer's unit of proven practicability.

The placer's unit 70 comprises the car 71 and the cabinet 72. The car 71 provides the moving floor or platform 73 and work table 74.

Channels 75 form the upright structural members of car 71. The channels 75 are bent to provide forwardly extending horizontal portions 76. The portions 76 are joined by horizontal channels 77 fastened at their ends to portions 76 of channels 75.

The bottom ends of channels 75 are connected by the platform 73. The platform 73 consists of angle irons 78 joined to form a box-like structure and is covered with sheet metal 79 to afford the floor upon which the placer may stand. This platform structure is secured to channels 75 in any suitable manner, as by welding for example. Diagonally extending strips 80, connecting with channels 75 and with the platform structure 73, strengthen the car. The work bench 74 is fastened at its ends to the channels 75 in any suitable manner, and is arranged for the convenience of the placer. Saggers are placed on the work bench 74 and are filled there.

The movement of car 71, as the placer works, tends to place him under a strain unless every precaution is taken to eliminate annoying vibration and shaking. Placing of ware is a careful operation; shaking and vibration of car 71 must be eliminated as nearly as possible for that reason, too. Freedom from vibration and shaking of car 71 is obtained by the manner of suspension.

Since there is constant activity on the cars by the placers, it is inevitable that there will be an accumulation of débris, the pins used in placing the ware for example, under foot and on the floor beneath the conveyer. To escape jarring of the car consequent upon riding over such débris, the cars 71 are suspended from an overhead rail 81. The rail 81 is supported by a suitable superstructure, not shown. The rail 81 extends in a complete loop about which the cars 71 travel continuously. Conventional trolleys 82 track along the rail 81. The trolleys 82 connect with and support the chain 83 through which the power for moving the unit 70 is transmitted. A conventional power drive, not shown, is provided for driving the chain 83. Certain trolleys 82 may be provided only for supporting the chain 83 so that there will be substantially no slack in the chain. The elimination of slack in chain 83 aids in eliminating vibration and shaking of cars 71 since the presence of slack tends to cause a jerky movement of cars being driven.

The channels 77 are spaced apart to provide a slot 84 therebetween. The trolleys 82 are provided with extensions 85 and 86. Extension 85 is arranged in slot 84. A collar 86' is rigidly mounted on extension 85, by welding for example. Extension 85 reaches beneath the underside of channels 77. A suitable collar, not shown, surrounds the lower end of extension 85, is loose on extension 85, and abuts against the underside of channels 77, spanning the slot 84. A resilient member 87 is arranged on the lower end of extension 85 between the last described collar and a nut 88 threaded on the end of extension 85. Nut 88 is drawn up to secure the channels 77 between the collar 86' and the resilient member 87. This affords a secure connection, at a definite location, between the chain 83 and the car 71. The resilient member 87, which may be a rubber pad or a coil spring for example, serves as a shock absorber to eliminate transmission of vibration from the power drive through the chain 83 to the cars 71. The resilient member 87 also dampens and largely eliminates the transmission of shaking, induced in individual cars by the activities of the placers, from car to car.

As described in connection with Figures 1 and 2, the conveyer system is in the form of a loop. The loop has long straight sides and sharply curved ends. This arrangement is desirable so that a continuous moving floor may be maintained along the cars which is broken for a minimum interval of time while the cars pass around the short arcs at the ends of the loop. As the cars 71 travel around the arcs at the end of the loop, each car spans the curved rail 81 as the chord of an arc. The chain 83 tracks around the periphery of a wheel located at the turn. One of these wheels may supply power to the chain and the other wheel may be an idler, at the two ends of the loop. Or, both wheels may idle and power be supplied through a caterpillar drive. The wheels keep the chain 83 taut and prevent undue loads from being imposed upon the trolleys. The slot 84 in which the extensions 85 and 86 are arranged, forms a chord across the arc through which the chain 83 travels. Therefore, the distance between extensions 85 and 86 must shorten, to allow for the difference between the length of the arc and the length of the chord across the arc, as the cars 71 pass around the turns at the ends of the loop. Provision must be made to allow for the changing distance between extensions 85 and 86 as the cars 71 enter and leave the turns.

The cars 71 move in the direction of the arrow in Figure 4. The extension 85 leads extension 86 and the driving connection between the chain 83 and the car 71 is made through extension 85. To allow for the changing distance between extensions 85 and 86, extension 86 is arranged for movement along the slot 84. Since extension 86 is one of the supports for the car 71, the load upon it and the relative movement between the extension and the channels 77 constitute a possible source of shaking or vibration for the car 71. To obviate the development of any vibration, and to allow complete freedom of movement for extension 86 along slot 84 while carrying the load of the car, a pair of wheels 89 are mounted on a shaft 90 fixed to the lower end of extension 86. Each of the channels 77 rest upon one of the wheels 89. The wheels 89 may be of non-metallic material to eliminate metal to metal contact and thus further reduce the possibility of creating vibrations and noise. As the cars 71 pass around the turns, the rollers 89 ride along the underside of channels 77, shortening the distance between extensions 85 and 86 as the car enters the curve and restoring those extensions to their normal spacing as the car leaves the turn. Jamming and undue strain upon the operating parts are obviated by this construction.

To prevent side sway of car 71, it is supported against lateral movement at its base. An overhead structure for the same function may be substituted. The support at the base affords maximum stability and the structure is such, as will be described, that no objectionable actions occur because of the location. A rail 91 is arranged beneath the platform 73 approximately below the beam 81. Rail 91 may be mounted on the floor beneath the conveyer or upon any suitable supporting structure. The rail 91 has a vertical rib 92 which is engaged on both sides by adjacent wheels 93. The wheels 93 rotate on pins 94 fixed in cross member 95. Cross member 95 is rotatably mounted on a pin 96 fixed in plate 97 secured to the bottom face of the sheet of metal 79. A lug 98 extends from cross member 95 and a spring 99 connects with the lug 98. The other end of spring 99 connects with a lug 100 fastened to the bottom face of the sheet 79. The wheels 93 are spaced apart a distance greater than the thickness of rib 92. The spring 99 pulls on the cross member 95 which rotates about pin 96 until the wheels 93 contact with opposite sides of rib 92.

The wheels 93 are arranged to contact with the vertical rib and are placed above the floor so as to clear any débris accumulated there and thus reduce the possibility of jarring car 71, by engagement with débris, to a minimum. When the cars 71 pass around the turns at the end of the conveyer loop, the wheels 93 are kept in contact with the opposite sides of rib 92 by spring 99 while adjusting their position, by rotation of cross member 95 about pin 96, to accommodate the curvature of rib 92. This structure provides good support for the car 71 to prevent lateral movements while obviating the creation of vibration or shaking due to engagement of débris or due to passage of cars around the turn of the conveyer loop.

The construction so far described affords a substantially vibrationless support for the car with provision for preventing side sway. Practical limitations in conveyer construction prohibit making the car so rigid and so firmly mounted as to eliminate end sway or weave of the car platform as a workman moves about it. The cars are arranged in end to end relationship to provide a substantially continuous moving floor. This juxtaposition of car platforms, in addition to elimination of shaking for the benefit of the workmen, makes it necessary to eliminate end weave of the cars. For that purpose, suitable structure is provided for connecting car platforms so as not to permit endwise relative movement between the platforms. Such structure may be of various design, within the purview of this invention, one suitable form being illustrated in Figures 4 and 5. To prevent such relative movement between car platforms as would cause separation, links 200 and 201 are pivotally mounted as indicated at 202, on the underneath side of the car platforms. The links 200 and 201 are pivotally connected as indicated at 203, which pivot is located substantially midway between the cars when the links are in their fully extended position, as illustrated in Figure 5. As shown in Figure 5, stops 204 are provided on the car platforms against which links 200 and 201 abut when in fully extended position. As shown in Figure 5, the fully extended position of links 200 and 201, as determined by engagement with stops 204, is slightly displaced from dead center position so that the links may break at pivot 203 whenever pivot points 202 are moved toward one another, which event occurs as the cars traverse the turns in the conveyer loop. On the straight portions of the conveyer loop, an abutment 205 is rigidly mounted on the forward end of each car platform and the abutment 205 engages with the trailing end of the leading car platform. The abutment 205 limits the closeness of approach of the car platforms on the straight portions of the conveyer loop while not interfering with the relative movement between car platforms at the turns.

By reason of the construction last described, relative endwise movement between car platforms is prevented on the straight portions of the conveyer loop and the platforms together constitute one continuous moving floor without substantial relative movement between the platforms which make up the floor throughout the straight lengths of the conveyer system. Workmen may move along the moving floor with the same ease and safety as on a stationary floor and the shifting weight of the workmen is restrained, by the various structures hereinbefore described, from causing any substantial shaking or weaving or relative movement of the parts of the moving floor.

Thus a car structure and suspension is provided for carrying the placer while at work under conditions of stability and freedom from shaking or vibration which closely approximate the working conditions at the usual stationary work bench.

The ware cabinet 72 comprises vertical channels 101 joined across the top by a channel and across the bottom by the tray 102. A cover 103 is fastened to the top channel and extends over the cabinet. Projections 104 are carried by channels 101 and extend inwardly of the cabinet. The projections 104 carry bars 105 adapted to support, at the ends, boards loaded with ware. It is customary to bring the ware to the placer on boards and such boards are placed on the rods 105 by a workman.

It is desirable to associate the cabinets and the cars in pairs which form a unit at all times throughout the course of travel of the conveyer system. The paired relation of car and cabinet, forming a unit, eliminates the possibility of confusion as to which cabinet goes to the particular car, it insures proper alignment of cabinet and car at all times, and it eliminates the constant service attention required to maintain independent conveyer systems properly coordinated.

In the broader aspects of this invention, the cabinet may be made integral with the car and be supported from the frame of the car. Several advantages which will appear in the following description accrue from providing a flexible connection between the car and the cabinet so that the relative positions of the car and cabinet in each unit may be varied in a predetermined manner as the unit passes through the cycle of operations around the conveyer system.

There are many ways of affording an adjustable connection between the cabinet and car of a unit, within the purview of this invention. For example, the cabinet may be mounted on the framework of the car by a structure permitting relative movement between cabinet and car and such movement may be effected by the operator moving with the car or by suitable mechanical means associated with the conveyer system as by a cam and cam follower, the power being supplied by the conveyer system. Figure 4 illustrates a form of adjustable connection between cabinet and car.

In practice, it has been found suitable to provide an auxiliary rail 106 supported by a superstructure, not shown. The cabinet 72 is suspended from rail 106 by trolleys 107 which ride along the rail 106 and which connect with the top channel of the cabinet.

To maintain the unitary association between car 71 and cabinet 72, a permanent structural connection between the two is provided which also serves as the means for transmitting force from car 71 to cabinet 72 to move the cabinet along the rail 106. While such a structure may take a wide variety of forms, within the purview of this invention, one form found to be suitable is illustrated in Figure 4. The structure may comprise angle irons 108 and 109 mounted on the top of cabinet 72 and extending laterally therefrom toward the car 71. The angle irons 108 and 109 support a ball and socket joint 110 at their extremities. Connecting rod 111 has one end mounted in the socket 110 and the other end mounted in socket 112 of another ball and socket joint. Socket 112 is mounted on post 113 extending upwardly from and fastened to the forward side channel 75 of car 71. The supporting structure for the ball and socket joints 110 and 112 is arranged so that, during the course of all relative movements between cabinet 72 and car 71, the connecting rod 111 will not depart excessively far from parallel relation to the direction of travel of the units, either laterally or vertically, to avoid placing undue strains upon the trolleys, of either the cabinet or the car, by the towing force exerted through connecting rod 111 on the cabinet 72. The connecting structure is arranged for clearance throughout all relative movements of the cabinet and car.

The cabinet 72 should be supported against side sway and, since the car and cabinet are mounted on different rails, it is desirable to prevent relative movement between cabinet and car due to imperfections in conveyer construction. Both ends are attained by providing arms 114, mounted on channels 101 of the cabinet, which extend toward and in proximity to the channels 75 of car 71. The arms 114 have fingers 115 arranged to fit in the sockets 116 secured to channels 75. The fit of fingers 115 in sockets 116 is loose and sockets 116 are open at both ends and at the top to permit easy withdrawal of fingers 115 therefrom. During placing, the operating position of the cabinet and car is illustrated in Figure 4 and fingers 115 riding in sockets 116 support the cabinet 72 against side sway and prevent any substantial displacement between car and cabinet.

The nature of the connection at finger 115 and socket 116 permits freedom of movement between car and cabinet where intended. One of the advantages of the flexible connection between cabinet and car is in the simplification of the conveyer structure at the turns in the conveyer loop. Since the cars and cabinets travel at the same speed on the straight portions of the system, when the units make the turns either one of two things must be done. Either, the length of the arc around the turn must be the same for the rail 81 and the rail 106, in which case the paths of cabinet and car must cross. Or, the rails may be concentric, in which case the cabinet must move more rapidly than the car. The flexible connection between the cabinet and car permits the latter of the two possibilities. A compromise between the two extremes may be made, which would require the flexible connection of this invention. By moving the cabinet more rapidly than the car on the turns, the rails 81 and 106 may be arranged concentrically at the turns which is desirable from an engineering and operating standpoint.

Figure 6 shows diagrammatically the concentric arrangement of rails 81 and 106 and the relative position of cabinet and car on the turn as compared with that relative position when the unit is on straight portions of the loop. The relative position of the car and cabinet on the straight rails, as shown in Figure 6, corresponds to Figure 4. As the unit moves around the turn, the cabinet moves faster than the car, upon entering the turn, and assumes the advanced position relative to the car. The connecting rod 111 swings outwardly to accommodate the changed position between car and cabinet. As the unit leaves the turn, the cabinet moves more slowly than the car, and backward relative to the car, to resume the initial position. The car moves at a uniform rate of speed around the turn.

In order to free the cabinet from the car at the connection between finger 115 and socket 116.

when making the turn, rail 106, at the turn, is elevated above the level of the straight portions of the rail. The relative vertical positions of the car and cabinet is illustrated diagrammatically in Figure 7. The working position of the cabinet is shown in full lines. The position of the cabinet, elevated to clear fingers 115 from sockets 116 for making the turn, is shown in dotted lines.

If only the problem of making the turns were involved, it would be sufficient to mount the cabinet on the car and to provide only one rail to support the whole unit. However, there are other advantages to the flexible connection between cabinet and car. When loading and unloading saggers onto and from the work bench 74, from a position outside of the conveyer system, the cabinet 72 obstructs access to the work bench. The flexible connection between car and cabinet provides means by which the cabinet may be moved out of the way of workmen on the outside of the conveyer system so as to make the car 71 equally accessible from either outside or inside.

It has been found suitable to elevate the rail 106 well above the rail 81 to provide head clearance beneath the cabinet 72 for workmen who must have access to the car 71 from outside the conveyer system. As the unit moves in that portion of the conveyer system where the rail 106 is elevated above rail 101, for head clearance, the cabinet 72 is lifted free from the connection between fingers 115 and sockets 116 and advanced up an incline of rail 106 by the towing force exerted through connecting rod 111, which turns upwardly above the ball and socket joint 112. When the cabinet 72 reaches the high level of the rail 106, the operating connection between car and cabinet remains the same except that the connecting rod 111 extends upwardly instead of downwardly from ball and socket joint 112. The unit progresses with the cabinet and car arranged in those relative positions and may make a turn in the conveyer loop while the cabinet is so elevated. Figure 7 illustrates diagrammatically the relative vertical positions between car and cabinet when the cabinet is elevated to provide head room for workmen having access to car 71 from outside the conveyer system. The cabinet is illustrated in dot and dash lines for the elevated position to allow head room.

The conveyer systems, and particularly the structure in Figure 4, have been described in connection with the operation of placing in the pottery industry, and particularly features have been explained with the placing operation as the background from which particular reasons for the construction are derived. Obviously, the invention is not so limted. The nature of the work performed on a car, such as car 71, may be any of a great variety. The advantages attendant upon moving the workmen with the car and of maintaining working conditions on the car which simulate the steadiness and freedom from machine annoyance which characterizes a stationary work place applied equally well to other manufacturing operations. The arrangement of an auxiliary part to the car 71, of which the cabinet 72 is an example of such an auxiliary part, the two being arranged in a unit with a flexible connection between, obviously has many other applications and functions. The auxiliary part may be made to move relative to the car in a great variety of ways by the power supplied from the conveyer system and in accordance with a predetermined schedule to aid a workman in the performance of his operations. The auxiliary part, cabinet 72 for example, may be provided for supporting a product being assembled progressively, and the auxiliary part may be made to move to and from, up and down, relative to car 71 to assist a workman in the task of attaching parts to the object being assembled. Or, a workman on the moving car may be engaged in a machine operation, and the auxiliary part, or "cabinet", may be arranged to control or modify the machine operation, to advance the machine from one operation to another, to advance successive pieces into position to be acted upon by a machine, to carry tools and materials for the workman. These are but some examples of the applications of the auxiliary part or "cabinet" which forms a unit with the operator car and which undergoes a cycle of movements, in addition to traveling about the conveyer, by the power and actuation of the conveyer system. The rail 106 may be considered as a cam for actuating the cabinet, although it also supports the cabinet. Obviously, the cabinet may be supported solely by the car, be adjustable relative thereto, and be actuable by a cam, rail 106 being one example of such a cam. The term "cabinet" used in the claims is hereby defined as covering a part auxiliary to, and forming a unit with a car, without specific limitation to its functions or uses. The structure illustrated in Figure 4 is but one example in which many variations in the details of construction, operation, and functions may be made within the purview of this invention.

Since the placers carry on their work inside of the conveyer system, freedom of movement in and out of the conveyer system is important. For that purpose, according to this invention, access cars are provided in the conveyer system. Such an access car is shown at 114' in Figure 4. Access car 114' comprises upright channels 115' bent to provide forward projections 116' united by top channels 117. A slot 118 is provided between channels 117 and the car 114' is supported from rail 81 by trolleys 82 connected to channels 117 in the same manner as in the case of car 71. A platform 119 similar in construction to platform 73 joins the bottoms of channels 115. Workmen may pass freely into and out of the conveyer system by walking through access car 114', on platform 119. A fragment 120 of the floor within the conveyer system is shown in association with car 114'. The cars of the conveyer system all have the inner edges of the platform arranged in proximity to the floor 120. Workmen may step from floor to platform without danger. Likewise, the outside edges of the car platforms are in proximity to the floor outside the conveyer system. The tops of the platforms are flush with the floors.

To enable the workmen to step from car to car without danger, it is desirable to arrange the cars so as to provide a substantially continuous floor made of moving platforms. However, some space must be allowed between the platforms in order that the cars may go around the turns of the conveyer loop without jamming. Such space is indicated at 121, Figure 4. To cover the gap between the platforms 73 and 119, for example, an insert 122 is hinged, as indicated at 123, to the trailing end of each car. The margin of the insert 122 distant from its hinges rests upon the adjacent channel of the following car as indicated at 123. A portion of the sheet metal top 79 of the platform structure is cut away as indicated at 124 (car 71) so that the insert 122 will be flush with the top of the platform of the following car. In making the turns, the inserts 122 are raised about their hinges, as indicated at 125, to prevent jamming between cars. Each insert 122 is provided with a downwardly extending trip 126. At the turns in the conveyer loop, a plate 127 is arranged beneath the cars so as to be engaged by each trip 126. The plate 127 is raised sufficiently that engagement of the trip with the plate lifts the insert 122 to a position such as indicated in 125. The plate 127 extends completely around the turn and the inserts 122 are maintained in elevated position throughout the passage of the cars around the turn to prevent jamming between the cars. When the turn is completed, the trips 126 leave the plate and the inserts 122 fall back into position, bridging the gap between the car platforms. Thus, the continuous moving floor is provided by the car platforms throughout the straight portions of the conveyer system so that the workmen may move freely from car to car without danger. When workmen arrive at the end of the loop, they step off the car entering the turn, cross the floor 120, and resume operations on the car leaving the turn.

While the invention has been described in detail by way of illustration, it is not intended so to limit the invention. Variations in the details of construction may be made by one skilled in the art without departing from the spirit and scope of the invention as defined in the following claims.

I claim:

1. A conveyer system comprising a pair of rails substantially parallel and spaced apart, a series of cars, trolleys for suspending each car from one of the rails for movement along the rail, a fixed connection between only one of the trolleys and the respective car, a connection between another trolley and the same car permitting shifting movement between car and trolley, a power driven flexible member connected with the trolley, roller means on each car for engaging the other rail in a lateral direction relative to the plane determined by the rails, said cars each having a platform for carrying workman, said platforms arranged end to end, connecting means joining adjacent platforms to prevent relative endwise movement between platforms.

2. A conveyer system comprising an overhead rail, a series of cars, trolleys arranged to track along the rail, a power driven flexible member connected with the trolleys, vibration eliminating connections between each car and the respective trolleys, including means permitting shifting movement between each car and at least one of the trolleys for the car, a second rail spaced from and substantially parallel to the overhead rail, rollers mounted on each car, said rollers being arranged to track on opposite sides of the second rail, said rollers engaging the second rail in a direction lateral to the direction of the load of the cars on the overhead rail, a platform on each car for carrying a workman, the cars being arranged with the platforms end to end in the direction of car movement, articulated and abutment connections joining adjacent ends of adjacent cars.

3. A conveyer system comprising an overhead rail having curved portions, trolleys arranged to track on the rail, a series of cars each suspended from a pair of trolleys, one of said pair of trolleys being fixedly connected with the car and the other of said pair of trolleys being arranged for free movement relative to the car in the direction of car travel, a second rail spaced from and substantially parallel to the overhead rail, tracking elements on the car arranged to engage the second rail in a direction lateral to the direction of the load of the car on the overhead rail, means for varying the spacing of the elements relative to the rail, resilient means for maintaining the elements in engagement with the rail.

4. A conveyer system comprising an overhead rail having curved portions, trolleys arranged to track on the rail, a power drive connected with the trolleys, a series of cars each having a platform with the platforms arranged in end to end relation, each car being suspended from a pair of trolleys, a resilient fixed connection between each car and one trolley, a freely rolling element on the other trolley of the pair arranged to receive the load of the car and move relative to the car in the direction of car travel, a second rail spaced from and substantially parallel to the overhead rail, rollers adjustably mounted on the car and arranged to engage opposite sides of the second rail in a direction lateral to the direction of the car load on the trolleys, resilient means for maintaining the rollers in engagement with the rail, articulated and abutment means connecting the adjacent car platforms to prevent relative endwise movement of the car platforms.

5. A conveyer system comprising an overhead rail having curved portions, a series of cars suspended from and movable along the rail, each car having a workman carrying platform, the platforms being arranged end to end and spaced apart, an insert arranged to bridge the gap between adjacent platforms, articulated means connecting the platforms to prevent relative endwise movement between platforms, said articulated means operating to permit relative movement between platforms when the cars traverse the curved portion, and a trip on the insert arranged to engage a stationary part of the system for displacing the inserts from gap bridging position.

6. A conveyer system comprising a series of cars, a platform on each car for carrying a workman, a rail for supporting the cars, power means for moving the cars along the rail, the rail having curved portions, said platforms being spaced apart to afford clearance between the cars when traversing the curved portions, an insert on each car for spanning the gap between car platforms, means arranged to displace the insert from gap spanning position as the cars traverse the curved portions.

7. A conveyer system comprising a series of cars, rail structure and power means for moving the cars in a closed circuit having turns, said cars each having a platform for carrying a workman at floor level, the platforms being arranged on the inside of the loop, certain cars having means adapted for production operations by the workman, other cars being open across the path of travel of the conveyer, the cars being spaced apart to afford clearance between cars traversing turns, an insert on each car for bridging the gap between car platforms, cam means at the turns of the system, means on the inserts for engaging the cam means to displace the inserts from gap bridging position as the cars traverse the turns.

8. A conveyer system comprising a series of cars, rail structure and power means for moving the cars in a closed circuit having turns, said cars each having a platform for carrying a workman, the cars being spaced apart to afford clearance between cars traversing turns, articulated means connecting car platforms to limit separation between the platforms, an insert on each car arranged to bridge the gap between platforms, insert displacing means arranged at the turns, means on the inserts for engaging with the displacing means at the turns, said articulating means operating to permit relative movement between car platforms at the turns.

9. A conveyer system comprising a series of cars, a platform at floor level on each car adapted to carry a workman engaged in production on the car, said system being in the form of a closed loop, said cars being arranged with the platforms on the inside of the loop, access cars in the series of cars, said access cars each having a platform at floor level and being open across the path of travel of the conveyer system, power means for moving the cars continuously.

10. A conveyer system comprising a series of cars, a platform at floor level on each car adapted to carry a workman engaged in production on the car, said system being in the form of a closed loop, said cars being arranged with the platforms on the inside of the loop, access cars in the series of cars, said access cars each having a platform at floor level and being open across the path of travel of the conveyer system, power means for moving the cars continuously, connecting means joining adjacent platform to prevent relative endwise displacement.

11. A conveyer system comprising a series of cars, an overhead rail in a closed loop, trolleys arranged to track on the overhead rail, each car being supported by respective trolleys, a second rail spaced from and substantially parallel to the overhead rail, tracking means on the cars arranged to engage the second rail to prevent side sway, at least one car having a platform at floor level and being open across the path of travel of the system, means connecting the platforms of adjacent cars to prevent end sway of the play.

12. A conveyer system comprising a series of cars, an overhead rail in a closed loop, trolleys arranged to track on the overhead rail, each car being supported by respective trolleys, a second rail spaced from and substantially parallel to the overhead rail, tracking means on the cars arranged to engage the second rail to prevent side sway of the car, each car having a platform at floor level for carrying a workman, said platforms being arranged on the inside of the loop, at least some of said cars being open across the path of travel of the conveyer system, articulated and abutment means between adjacent platforms to prevent relative endwise movement between platforms.

13. A conveyer system comprising a series of units movable in a closed circuit, each unit including a car and a cabinet, means connecting the car and cabinet permitting variation in the spatial relation between car and cabinet, means operable by movement of the unit along the conveyer circuit for varying the spatial relation between car and cabinet of a unit in predetermined schedule.

14. A conveyer system comprising a series of units, each unit including a car and a cabinet, the car and cabinet being mounted for movement, the one relative to the other, cam means for varying the spatial relation between the car and cabinet as the unit traverses the conveyer system.

15. A conveyer system comprising a series of units, each unit including a car and a cabinet, a supporting means for the car and the cabinet, power means for moving the car, adjustable means connecting the car and the cabinet for moving the cabinet with the car, cam means for varying the spatial relation between the car and the cabinet as the unit traverses the system.

16. A conveyer system comprising a series of units, each unit including an operator carrying car and a cabinet, rail structure for supporting the car and rail structure for supporting the cabinet, power means for moving the car along its rail structure, a flexible connection between the car and cabinet for moving the cabinet with the car, said rail structures being arranged in various spatial relations for varying the spatial relation between the car and cabinet as the unit traverses the system.

17. A conveyer system comprising a series of units, each unit including an operator carrying car and a cabinet, rail structure for supporting the car and rail structure for supporting the cabinet, a link pivotally connected to the car and to the cabinet, power means for moving the car.

18. A conveyer system comprising a series of units, each unit including an operator carrying car and a cabinet, rail structure for supporting the car and rail structure for supporting the cabinet, a link pivotally connected to the car and to the cabinet, power means for moving the car, means on the car and on the cabinet arranged for engagement to prevent substantial lateral movement between car and cabinet.

19. A conveyer system comprising a series of units, each unit including a car and a cabinet, a rail structure for the car, a rail structure for the cabinet, the length of the two structures being different along arcs of turns in the system, power means for moving the car along the rail structure therefor, a flexible coupling between the car and the cabinet for moving the cabinet with the car, said coupling operating to vary the speed of the cabinet at the turns.

20. A conveyer system comprising a series of cars and a series of cabinets, rail structure and power means for moving the cars and cabinets in a circuit, connections between the cars and cabinets for maintaining the cars and cabinets in paired relation to form units, means for varying the spatial relation between car and cabinet by the power from the conveyer system as the units traverse the circuit.

LYLE W. BOWERS.